United States Patent [19]

Borrin

[11] 4,050,974

[45] Sept. 27, 1977

[54] METHOD OF REDUCING INTERLINER REMNANT

[76] Inventor: Jules Borrin, 299 Sherman Ave., Teaneck, N.J. 07666

[21] Appl. No.: 761,979

[22] Filed: Jan. 24, 1977

[51] Int. Cl.² .......................... B31F 5/00; B32B 31/00
[52] U.S. Cl. .................................. 156/159; 156/251
[58] Field of Search ............... 156/251, 157, 159, 304; 2/243 R, 243 A, 243 B

[56] References Cited

U.S. PATENT DOCUMENTS

| 1,611,927 | 12/1926 | Midgley | 156/251 |
| 3,086,901 | 4/1963 | Ploeger | 156/159 |

*Primary Examiner*—Douglas J. Drummond
*Attorney, Agent, or Firm*—Kane, Dalsimer, Kane, Sullivan and Kurucz

[57] ABSTRACT

The disclosure is of a novel method of reducing remnant upon cutting interliner blanks from a plurality of strips of thermoplastic, bias-cut interlining material. The method comprises superposing a portion of the butt ends of the strips in a specific manner and fusing the strips together along a thin line adjacent the superposed butt ends. In the preferred method, butt ends distal to the fusion line are severed simultaneously with fusion to obtain a heat-sealed seam which is hardly detectable, strong and non-interfering with the use of the fused strips as interlining in collars, cuffs and center pleats.

7 Claims, 4 Drawing Figures

METHOD OF REDUCING INTERLINER REMNANT

BACKGROUND OF THE INVENTION

1. Field of the Invention

The invention relates to the cutting and joining of sheet goods and more particularly relates to methods of cutting and splicing textile interliners.

2. Brief Description of the Prior Art

Prior hereto blanks for collars, cuffs and center pleats were cut from interliner material such as woven textile fabrics. The strips were generally cut from larger sheets of the fabric. For example, relatively narrow strips of woven textile were generally cut on a bias from square woven sheets having widths of circa 45 inches. The strips so cut had a length of circa 64 inches. When blanks are cut from the strips there is generally a waste remnant. For example, if collar interliner blanks of 20 inches each are cut from the 64 inch strip, there is a 4 inch waste remnant. If center pleats are cut of 28 inches, only two can be cut, leaving an 8 inch remnant. Previous attempts to join strips of the interliner material, thereby reducing waste have not been entirely successful. Overlapping the butt ends and sewing the strips together leaves a "bump" or double thickness zone at the overlap. This of course is unsatisfactory. Similarly, the use of adhesives to join the butt ends increases the thickness of the strip at the splice.

By the method of the present invention, the butt ends of the interlining strips are spliced together leaving seams which are hardly detectable, thereby reducing the wastage when blanks are cut from the strips. The joined ends may be incorporated in the body of the interliner blank, since the seam is very strong and does not lend itself to ready detection.

SUMMARY OF THE INVENTION

The invention comprises a method of reducing remnant upon the cutting of interliner blanks from a plurality of bias-cut strips of thermoplastic, square-cut interlining material, which comprises:

providing first and second strips of a thermoplastic interlining material, bias-cut from a square woven sheet, said strips having upper and lower planar surfaces bounded by parallel bias-cut side edges, parallel butt end edges and substantially the same widths;

superposing a portion of the lower surface of the first strip over a portion of the upper surface of the second strip with a portion of a butt end edge of said first strip superposed over a portion of a butt end edge of said second strip, said superposed butt end edges being aligned with each other and each aligned butt end edge of each strip extending distally beyond one bias-cut side edge of the opposite strip a given distance;

fusing the first and second strips together along a thin line traversing the width of said strips along a line parallel to said aligned butt end edges, a distance from said aligned butt end edges equal to said given distance;

severing the portion of said strips between said thin line and the aligned butt end edges; and using the fused strips as a source of interliner blanks.

The invention also comprises the fused strips of the invention.

DETAILED DESCRIPTION OF THE INVENTION

Figure 1:
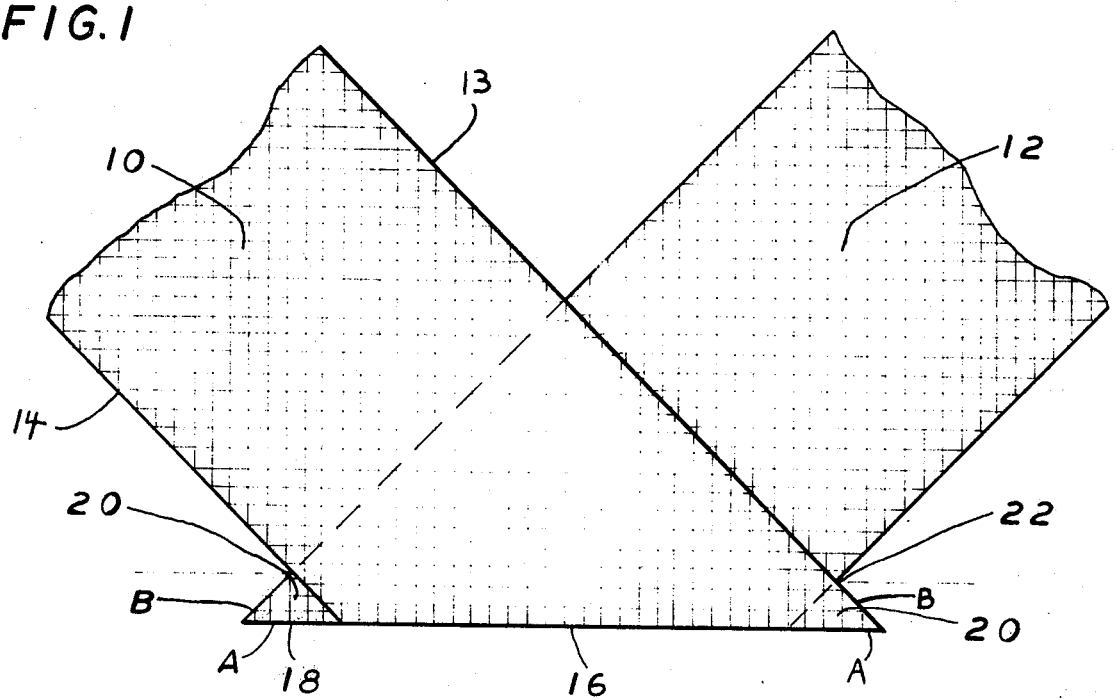
FIG. 1 is a view of superposed butt end edges of interlining strips prior to fusion.

The method of the invention is carried out by first providing bias-cut strips of thermoplastic square-woven interlining material. Any thermoplastic square-woven material may be used such as for example, woven polyester, polyethylene, polypropylene and like materials. The material may also include non-thermoplastic material, but for strength of the seam hereinafter described more fully at least 65% by weight of the material should be composed of thermoplastic polymeric matter. The angle of the bias-cut is not critical, but generally is circa 45°. The strips are preferably of a uniform width.

The bias-cut strips provided as described above will have upper and lower planar surfaces bounded by parallel bias-cut side edges and parallel butt end edges. The strips therefore will be substantially uniform in their width. Representative of such bias-cut strips is strip 10 shown in FIG. 1. The strip 10, shown in part, was cut on a 45° bias from a square-woven sheet of woven thermoplastic yarns. One butt end edge 16 of the strip 10 is the former edge of the square-woven sheet while edges 13 and 14 are parallel bias-cuts made through the body of the parent square sheet. At the opposite end of butt end edge 16 is a parallel edge representing a portion of the opposite edge of the sheet from which strip 10 was cut (not seen in FIG. 1). The strip 12 shown in FIG. 1 is identical to strip 10.

In the next step of the method of the invention, the strips 10 and 12 are superposed in a specific manner. That is, a portion of the lower planar surface of strip 10 is superposed over a portion of the upper surface of strip 12. As shown in FIG. 1, the superposition is such that the butt end edge 16 of strip 10 is aligned with the butt end edge 18 of strip 12 but superposes only a portion of the butt end edge of strip 12. The forward edge of butt end edge 16 extends distally beyond one of the bias-cut side edges of strip 12 to form a zone 20 which is not superposed over the strip 12. Similarly, a zone 20 of strip 12 exists where it extends distally beyond one bias-cut side edge 14 of strip 10. The uncovered zones 20 are bounded by free sides A and B which are equal in dimension. The side B terminates at point 22 where one bias-cut edge of strip 10 or 12 intersects with the bias-cut edge of the opposite strip 10 or 12.

Figure 2:
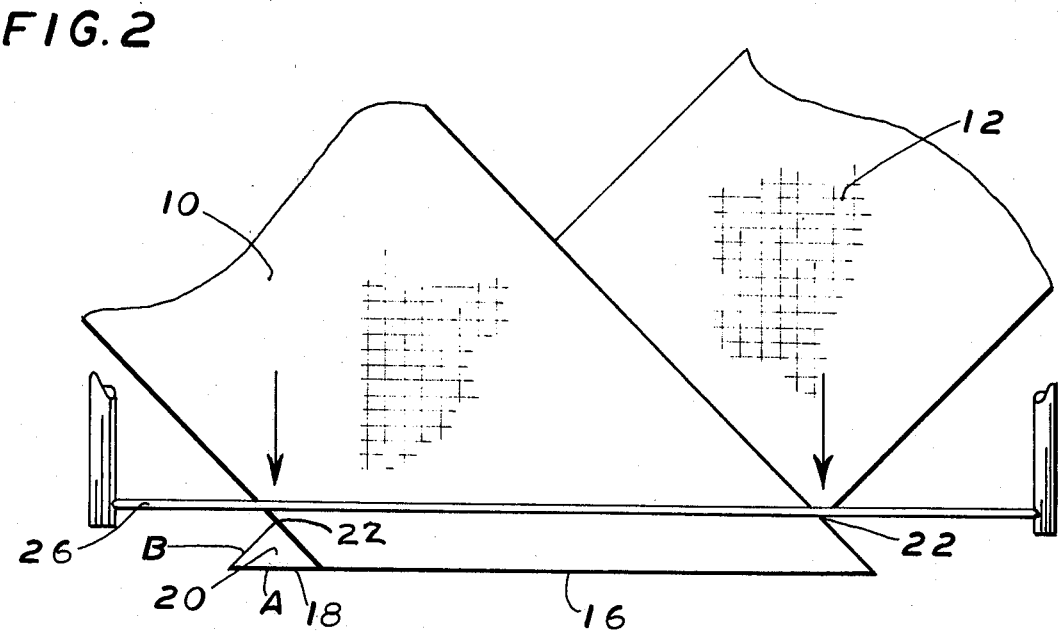
FIG. 2 is a view as in FIG. 1 showing fusion of the strips.
Figure 3:
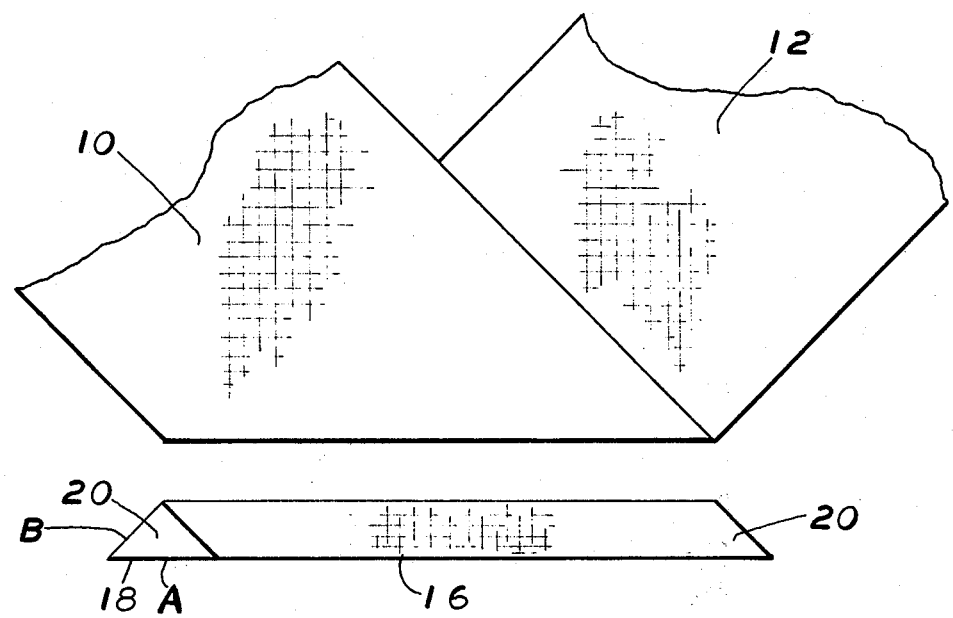
FIG. 3 is a view of the strips seen in FIG. 1 after fusion and severance of the butt end.
Figure 4:
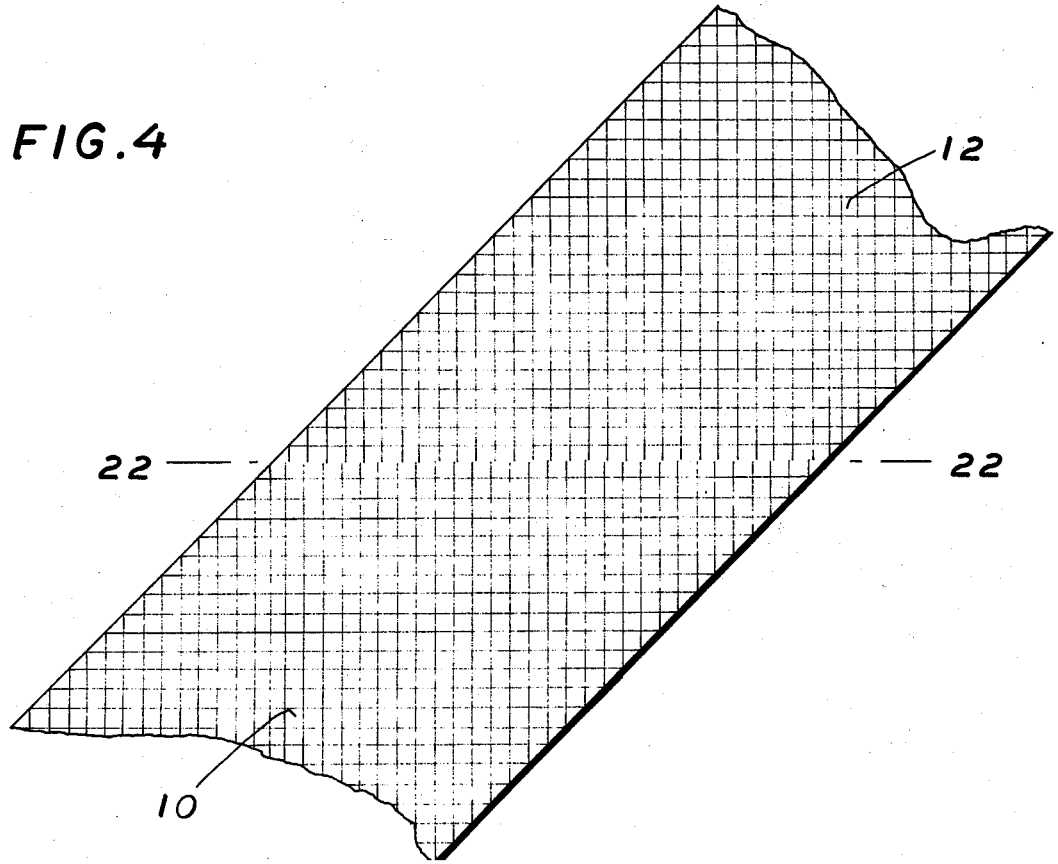
FIG. 4 shows the completed fused interliner strip.

With the strips 10 and 12 positioned as shown in FIG. 1, the strips 10 and 12 are then fused together along a thin line traversing the width of the strips 10 and 12 along a line parallel to the aligned butt end edges 16 and 18. The fusion line is maintained through points 22. The fusion line should be thin, i.e.; not more than 2 to 3 millimeters in thickness. As shown in FIG. 2, the fusion of strips 10, 12 may be accomplished by heat-sealing with a hot wire 26 pressed against the upper strip 10. The temperature of the hot wire 26 is selected to melt the thermoplastic yarns in strips 10, 12 and to fuse them back together again. Preferably the hot wire 26 simultaneously severs the portion or zone of strips 10, 12 which lies between the fusion line and butt ends 16, 18. If this zone is not severed simultaneously with fusion, it must be removed by cutting in a second operation. The simultaneous fusion and severance of the zone between the fusion line and the butt ends edge 16, 18 is shown in FIG. 3. Following severance of the zone, the strips 10 and 12 may be folded away from each other to obtain one continuous strip with a hardly discernible seam joining the two strips along fusion line 22—22. This seam will be found to be extremely strong and is hardly detectable. The fused strips may be employed to provide interliner blanks cut therefrom. If a given blank should be cut so as to include the seam, such will not interfere with the use of the blank as an interliner material.

By repeating the above procedure, any number of strips may be joined to each other to form a continuous strip of any desired length. Then when blanks are cut from the continuous length, there is a reduction of remnant or waste over that which would have occurred if the individual component strips had been cut. The seam will not interfere with the use of the continuous strip for interliner material for collars, cuffs, center pleats, etc. cm What is claimed is:

1. A method of reducing remnant upon the cutting of interliner blanks from a plurality of bias-cut strips of square-woven interlining material, which comprises:
   providing first and second strips of a thermoplastic interlining material, bias-cut from a square-woven sheet, said strips having upper and lower planar surfaces bounded by parallel bias-cut side edges, parallel butt end edges and substantially the same widths;
   superposing a portion of the lower surface of the first strip over a portion of the upper surface of the second strip with a portion of a butt end edge of said first strip superposed over a portion of a butt end edge of said second strip, said superposed butt end edges being aligned with each other and each aligned butt end edge of each strip extending distally beyond one bias-cut side edge of the opposite strip a given distance;
   fusing the first and second strips together along a thin line traversing the width of said strips along a line parallel to said aligned butt end edges, a distance from said aligned butt end edges equal to the distance from the point where said bias-cut edge of one strip intersects with said bias cut edge of the other strip (point 22 in the drawings);
   severing to remove the portion of said strips between said thin line and the aligned butt end edges; and
   using the fused strips as a source of interliner blanks.

2. The method of claim 1 wherein the thermoplastic interlining material is a woven polyester.

3. The method of claim 1 wherein said fusing is by heat sealing.

4. The method of claim 1 wherein said fusing and said severing are carried out simultaneously by heat sealing and severing.

5. The method of claim 1 carried out a plurality of times to obtain a continuous length of product.

6. The product of the method of claim 1.

7. A method of providing a continuous strip of bias-cut interlining material, which comprises:
   providing first and second strips of a thermoplastic interlining material, bias-cut from a square-woven sheet, said strips having upper and lower planar surfaces bounded by parallel bias-cut side edges, parallel butt edges and substantially the same widths;
   superposing a portion of the lower surface of the first strip over a portion of the upper surface of the second strip with a portion of a butt end edge of said first strip superposed over a portion of a butt end edge of said second strip, said superposed butt end edges being aligned with each other and each aligned butt end edge of each strip extending distally beyond one bias-cut side edge of the opposite strip a given distance;
   fusing the first and second strips together along a thin line traversing the width of said strips along a line parallel to said aligned butt end edges, a distance from said aligned butt end edges equal to the distance from the point where said bias-cut edge of one strip intersects with said bias cut edge of the other strip (point 22 in the drawings);
   severing to remove the portion of said strips between said thin line and the aligned butt end edges.

* * * * *